P. ADISON.
MOLDING OR CONDUIT FOR ELECTRIC WIRES.
APPLICATION FILED JULY 10, 1913.

1,117,748.

Patented Nov. 17, 1914.

WITNESSES

INVENTOR
Philip Adison
BY
ATTORNEYS

UNITED STATES PATENT OFFICE.

PHILIP ADISON, OF NEW YORK, N. Y.

MOLDING OR CONDUIT FOR ELECTRIC WIRES.

1,117,748.     Specification of Letters Patent.     Patented Nov. 17, 1914.

Application filed July 10, 1913. Serial No. 778,286.

*To all whom it may concern:*

Be it known that I, PHILIP ADISON, a subject of the Czar of Russia, and a resident of the city of New York, borough of Manhattan, in the county and State of New York, have invented a new and Improved Molding or Conduit for Electric Wires, of which the following is a full, clear, and exact description.

This invention relates to moldings or conduits for inclosing electric wires for systems of interior and exterior wiring, and it relates more particularly to conduits of that type consisting of a trough or base section for receiving the wires and a cover section having side flanges that spring or snap over the sides of the trough section.

The principal objects of the present invention are to improve the construction of conduits of the character referred to by providing on the sides of the trough or base section longitudinally-extending flanges with which the cover section engages, the said flanges being set inwardly from the sides of the base section, so that the cover section will be considerably narrower than the base section, whereby the sides of the latter overhang the cover and the water dripping down the said sides of the base section will have no chance to enter the joint between the two sections and interfere with the electric wires within the conduit.

Additional advantages are that the conduit is of comparatively simple and inexpensive construction and the sections are so designed that they can be connected as easily and quickly as could the sections in the old form of conduit.

With these objects in view, and others as will appear as the description proceeds, the invention comprises various novel features of construction and arrangement of parts which will be more fully described hereinafter and set forth with particularity in the claims appended hereto.

Figure 1:
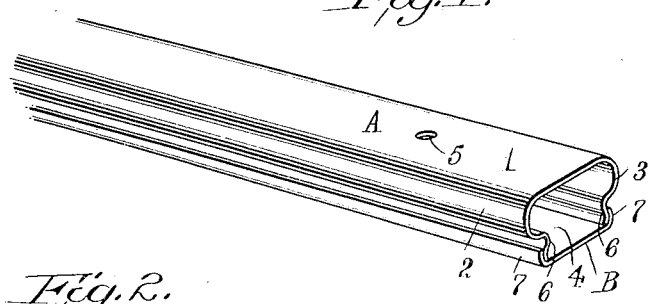
Figure 2:
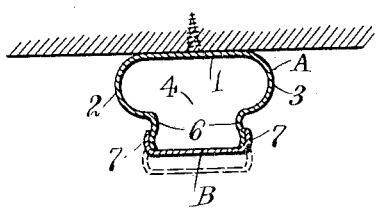
Figure 3:
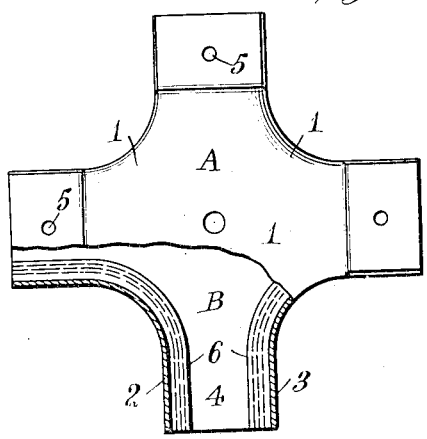
Figure 5:
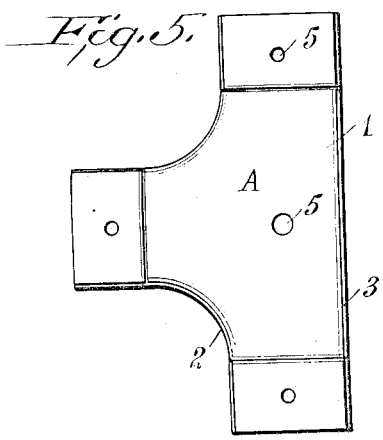
Figure 4:
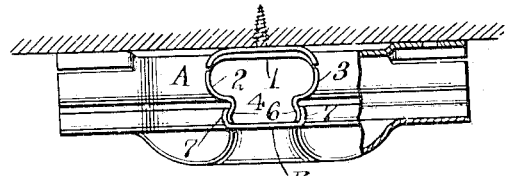
Figure 6:
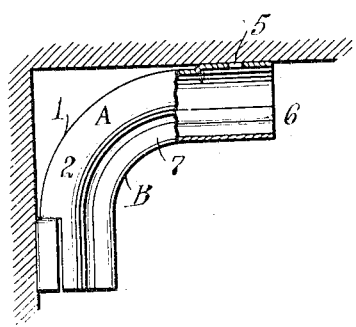
Figure 7:
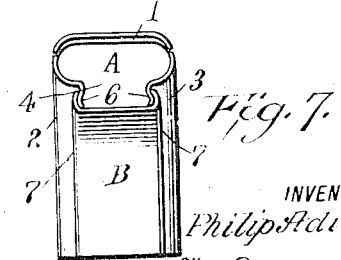

In the accompanying drawing which illustrates an embodiment of the invention, and wherein similar reference characters are employed to designate corresponding parts throughout the several views, Figure 1 is a perspective view of a portion of a conduit with the sections interlocked; Fig. 2 is a transverse section thereof; Fig. 3 is a plan view, partly broken away, of a cross union or coupling; Fig. 4 is a side view of Fig. 3 with a portion broken away; Fig. 5 is a plan view of a T-coupling; Fig. 6 is a side view, partly broken away, of an elbow coupling; and Fig. 7 is an end view of Fig. 6.

Referring to the drawing, A designates the base section of a straight portion or of a coupling of the improved conduit, such conduit being made preferably entirely of metal and the base section is in transverse cross-section approximately elliptical, that is to say, the base section A consists of a flat portion 1 and semi-circular side portions 2 and 3, there being an open channel 4 opposite the bottom portion 1, so that the electric wires can be placed in the base section A. The bottom 1 of the base section A is provided with perforations 5 for receiving screws or equivalent fastenings whereby the base section can be secured to a ceiling or wall or any other support. The sides 2 and 3 are formed with flanges 6 which extend the full length of the base section, and these flanges are set inwardly considerably from the outermost portions of the sides 2 and 3. Applied to these flanges is a cover section B which is formed with longitudinal side flanges 7 that have their internal surfaces concave to snap over and interlock with the convex outer surfaces of the flanges 6 on the section A. The side members 2 and 3 of the section A, together with the flanges 6, provide considerable resiliency, so that the cover section B can be easily snapped over the flanges 6. In interlocking the two sections A and B the cover section B is placed in the position shown by dotted lines, Fig. 2, and then a pressure is applied to the cover section in a direction toward the base section A, whereby the flanges 6 of the latter yield toward each other to permit the flanges 7 of the cover section to snap over the curved portion of the flanges 6. This manner of assembling is necessary in connecting the parts of the couplings or unions together, but in the case of the straight section of the conduit, as shown in Fig. 1, the two sections can be assembled together by a relative longitudinal movement after the ends of the two sections are brought into coöperative relation. It will be observed that the outermost portions of the sides 2 and 3 of the base section A overhang the sides of the cover section so that water on the sides of the base section will drip off without entering the joint between the two sections. Another advantage of providing the flanges 6 is that greater resiliency is provided whereby the sections can be more easily and quickly connected.

From the foregoing description taken in connection with the accompanying drawings, the advantages of the construction and method of operation and of the device shown will be readily understood by those skilled in the art to which the invention appertains, and while I have described the principle of operation, together with the device which I now consider to be the best embodiment thereof, I desire to have it understood that the device shown is merely illustrative, and that such changes may be made when desired as are within the scope of the appended claims.

Having thus described my invention, I claim as new and desire to secure by Letters Patent:

1. A conduit for electric conductors comprising a base section and a cover section, said base section consisting of a sheet metal structure formed with a base, side members connected with the base and yieldable toward and from each other, the edges of the side members being bent inwardly toward each other and each terminating in a flange, said flanges being substantially parallel with each other and extending outwardly away from the said base and being disposed both inwardly from the side members and the flanges being oppositely curved; and the cover section wholly outside the base section and consisting of a sheet metal piece of less width than the base section and having substantially parallel flanges at its sides curved to interlock with the outer surfaces of the flanges of the base section, said flanges of the base section being yieldable toward each other to permit of the cover section being placed on or removed from the base section.

2. A metallic conduit comprising a base and a cover section, the base section being wider than the cover section and the base section having an opening throughout its length to receive electric conductors, outstanding flanges formed along the edges of the opening, and flanges on the cover section spaced apart a greater distance than the flanges of the base section to engage the outer surfaces of the base section of the flanges, whereby the cover section is wholly outside the base section and the sides of the cover section are located inwardly from both sides of the base section.

In testimony whereof I have signed my name to this specification in the presence of two subscribing witnesses.

PHILIP ADISON.

Witnesses:
  GEORGE H. EMSLIE,
  PHILIP D. ROLLHAUS.